Sept. 2, 1969  N. M. PACKARD ET AL  3,464,707
PISTON OIL CONTROL RING ASSEMBLY
Filed Sept. 29, 1966
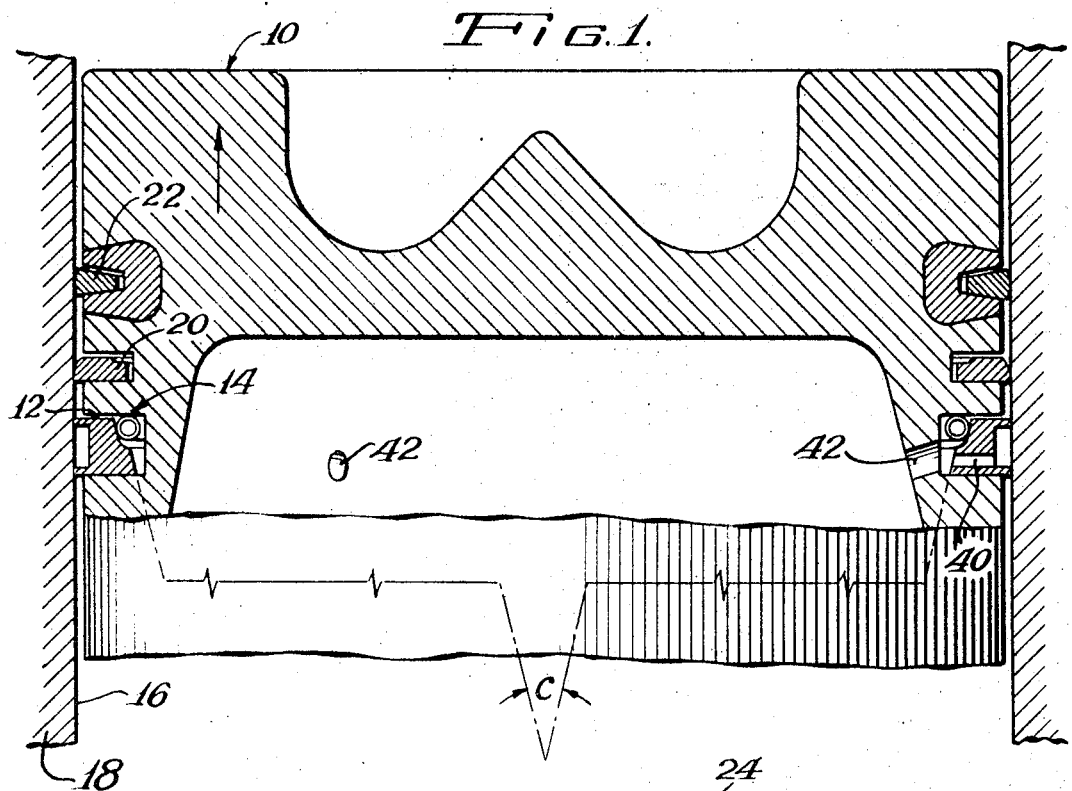
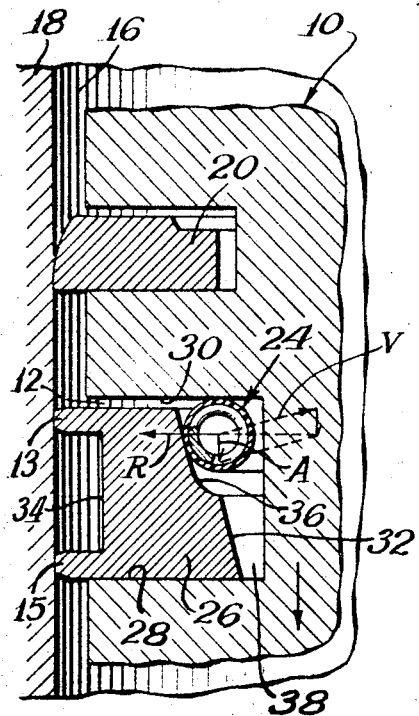
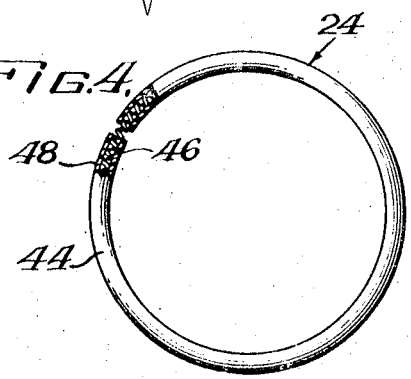
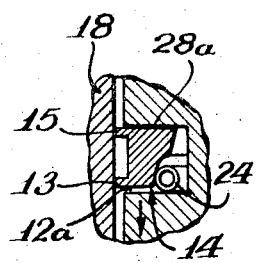
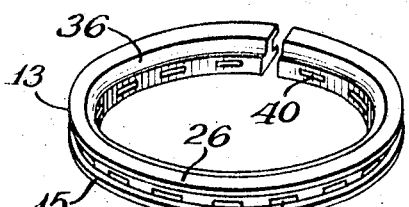
Inventors:
Norman M. Packard
Leonard O. Squinto
William Lenzi
By John W. Haines
Atty.

United States Patent Office 3,464,707
Patented Sept. 2, 1969

3,464,707
PISTON OIL CONTROL RING ASSEMBLY
Norman M. Packard, Des Plaines, Leonard O. Squinto, Berwyn, and William Lenzi, Western Springs, Ill., assignors to International Harvester Company, Chicago, Ill., a corporation of Delaware
Filed Sept. 29, 1966, Ser. No. 582,810
Int. Cl. F16j 9/06, 9/26
U.S. Cl. 277—143      5 Claims

ABSTRACT OF THE DISCLOSURE

Piston oil control ring assembly received by the piston oil control ring groove in a reciprocating engine. The assembly comprises a metal piston ring for effecting sealed engagement with a cylinder wall, and an expander and seal therebehind, i.e., inside the ring, forcing the ring to exert the required radial pressure against the cylinder wall, and to be sealed to the groove at both sides of the ring. The seal is an elastomeric sleeve and the expander is a coil compression spring surrounded by and coextensive for the full circular length of the sleeve.

---

This application relates to an oil ring on a piston, i.e., the ring carried by the piston and engaging a surrounding cylinder wall to control the amount of lubricating oil maintained on the wall. The application more particularly relates to an oil control ring assembly comprising a metal piston ring, and an expander and seal therebehind, i.e., inside the ring, forcing the ring to exert the required radial pressure against the cylinder wall and to be sealed to the groove at both sides of the ring.

In the drawing:

FIGURE 1 is a longitudinal view through an engine cylinder, containing a piston embodying the present oil ring assembly;

FIGURE 2 shows the detail of the ring assembly of FIGURE 1 to enlarged scale;

FIGURE 3 is an isometric view of the ring of the assembly;

FIGURE 4 is a top plan view of the expander of the assembly; and

FIGURE 5 is similar to FIGURE 2 except being to smaller scale and showing a modification.

In a reciprocating engine piston fitted with our improved oil ring assembly, and as indicated in general at 10 in the accompanying figures of drawing, the oil groove 12 in the piston receives a two-rail oil ring assembly 14 of the improved type having upper and lower rails 13 and 15. During the piston upstrokes, i.e., in the direction of the engine compression stroke indicated by an arrow in FIGURE 1, a spray of oil impinges in the regular way upon the cylinder wall 16 as it is uncovered in the cylinder 18 of the engine by the rising piston 10.

During downstrokes, e.g., a firing stroke as indicated by arrow in FIGURE 2, only a film-size amount of the accumulated oil on the cylinder wall is metered by the ring assembly 14 to the trailing compression rings 20 and 22 near the top of the piston. The rest of the oil is scraped from the cylinder wall by the assembly 14, because otherwise there would be a loss due to the oil being burned as the top of the piston clears and the internal combustion process progresses down into the cylinder.

Our oil ring assembly provides an improved side sealing action in the oil groove, forcing the oil metering to take place along the scraping edges or faces of the two ring rails 13 and 15 and blocking off any appreciable escape of the oil from the leading side of the ring to the trailing side by way of transfer through the innermost floor or rear section of the oil groove. Herein lies one of the technical advantages of our invention, because otherwise the chain of poor side sealing, which leads to the lubricating oil passing around the rear of the oil control ring, which in turn leads to unregulated flow of oil in excess of the required amount, causes an internal combustion engine to "burn" oil, i.e., it has excessive lubricating oil consumption.

Toward the above end, a combined, oil ring seal and expander ring 24 which is inside the assembly 14 exerts the usual radial expander force and, in cooperation with an oil control ring 26 on the outside, exerts side pressure so as to form a first side seal 28 of the ring 26 with the lower side of the groove, and reacts to that side pressure to form a second side seal between the ring 26 and an upper side 30 of the groove 12 through the intervening expander 24 (FIGURE 2).

The oil groove 12 is, in major part, occupied by the metal of the ring 26, which ring has a general block shape as viewed in cross section. The back face or rear 32 of the ring will be seen to have a unidirectional bevel compared to the generally cylindrical outer face 34, with the result that the ring 26 has uniform variation in thickness measured radially. The bevel includes a chamfer 36 having a constant cone angle and generally uniformly increasing in diameter in the direction of the plane of the rail 13. The cone of generation of the chamfer 36 has, at the apex as viewed in FIGURE 1, a cone angle C which in the preferred range is between about 15° and 40°.

If angle C is decreased in size, e.g., made up to 10° or 15° smaller, the radial expansion force is increased but there is a disadvantage in that the side sealing force is correspondingly reduced, and vice versa.

The combined seal and expander 24 acts against the chamfer 36, causing the chamfer as viewed in cross section to react in a direction normal to the chamfer as indicated by the diagonal vector V. Therefore, the expander 24 moves upwardly to bear firmly upon the groove upper side 30, and the resultant expander force is resolved into a radial, oil metering component R of comparatively large size and a smaller axial component A to provide for side sealing (FIGURE 2). The reduced thickness of the ring 26 provides sufficient relief to receive the seal and expander 24 in that vicinity, and neither the seal and expander nor the ring 26 touches the empty bottom or rear section 38 of the groove 12.

In its metering operation as viewed in FIGURE 2, the ring 26 scrapes away the oil below it by means of the lower rail 15 which allows only a metered large amount of oil to pass by such rail. The upper rail 13 then scrapes the large amount of oil, allowing a small amount to be metered past the rail, sufficient to provide a final film thickness capable of supporting the loads of the compression rings 20 and 22, but without excess.

The major portion of the large amount passes from the annulus between the rails, through customary radial slots 40 provided in the ring 26, and is admitted to the rear section 38 of the groove. The oil admitted thereto in that way, possibly augmented by leakage oil, if any, admitted through the lower side seal 28, has only the customary groove drain holes 42 through the piston wall for escape, because of the blockage of the expander 24 as it bridges between its line of ring contact with the chamfer 36 and its line of ring contact with the groove side 30 in forming the second side seal.

A flexible tube 44 and coil compression spring 46 therein coact to perform the combined seal and expander function of the assembly 24. The tube 44 is a heat resistant elastomeric material which is stable in the presence of oil and explosion gases.

Polytetrafluorethylene resin known as Teflon has proved very satisfactory when heat treated to preshrink the material preliminary to final installation in an engine. The tube 44 when installed circles back on itself so that the adjacent ends define a narrow, essentially constant length gap 48 therebetween. The leakage rate through the gap is low, and the preliminary heat treatment sets the tube length so as not to shorten and widen the gap under engine operating conditions.

The spring 46 similarly circles back on itself, with the adjacent ends being brought together in endless spring fashion and held in abutting relation by a conventional piloting or connecting stud, not shown. The tube 44 in entirety and the spring 46 are concentric to one another about a center falling on the longitudinal axis of the piston, and the individual coils of the spring and the tube, as viewed in cross section, are concentric to one another about centers falling on the circular axis passing through the annultr series of coils. The spring 46 per se is conventional, being of the type generally as shown in U.S. Patent No. 3,099,455.

The total loading on the face of the ring 26 results from a two-part effort by the ring 26 itself and the garter spring 46. The ring acts in bending when compressed radially to size, and coacts with the spring 46 which acts in compression when compressed radially to size.

Following is an example of the characteristics of one physically constructed embodiment of the invention.

| | |
|---|---|
| Number of holes 42 | One hole satisfactory, two or more preferable. |
| Slots 40: | |
| Number | Ten or twelve. |
| Length to width | 10:1 aspect ratio. |
| Number of piston rings | Three. |
| Shape of firing ring 22 | Keystone shape. |
| Ring 26: | |
| Material | Cast iron. |
| Ring gap | 0.005″ gap (hot). |

If the downstroke drag on the ring rails 13 and 15 is desired to augment the force of sealing in the side seal indicated at 28a, FIGURE 5, the seal simply takes the upsidedown position in the groove 12a as exemplified by the modification of the invention as shown in that figure. The combined seal and expander 24 blocks the oil so that the leading rail on the downstroke, in this instance the rail 13, performs the major wall scraping function for metering the large amount of oil. The trailing rail 15 on the oil ring performs the final metering on the downstroke.

The radially expanding expander 24 in pressing against the chamfer 36 on the ring has a pronounced separative force, the ring 26 tending to be displaced axially to one side and the expander 24 rides out to the illustrated point as far as possible past the opposite outer side of the ring 26. However, the separative motion actually produced by the expander 24 as it wedges or rolls toward the side is very minor, because the width of the groove 12 only slightly exceeds the axial thickness of the ring 26. The direction of side movement of the expander 24 is always away from the radially thicker part of the ring toward the area where the metal is thinner as viewed in cross section.

What is claimed is:
1. In combination:
   a cylinder, and a piston reciprocable therein;
   an annular groove in the piston, and a piston ring assembly therein, said groove having opposite lower and upper sides and a width dimension between the sides only slightly exceeding the minimum ring assembly width;
   said assembly including a ring and a combined seal and expander subassembly;
   said ring provided with a radially outwardly extending first rail adapted to bear radially against the wall of the cylinder, and a generally adjacent first side complemental with a first of said groove sides to provide a first side seal in the groove, a radially outwardly extending second rail provided on the ring adapted to bear radially against the cylinder wall in axially spaced apart relation from the first rail, and spring-engaging chamfer on a radially inner portion of the ring;
   said combined seal and expander subassembly bearing against the adjacent second one of said groove sides and against said chamfer in a direction radially outwardly of the ring and axially of the ring;
   said combined seal and expander subassembly comprising, respectively, a substantially circularly continuous sealing tube and a coil compression spring disposed coextensively therein and precompressed radially in size in service.
2. The invention of claim 1, characterized by:
   the combined seal and expander subassembly and the portion of the chamfer engaged thereby being constructed and arranged adjacent said upper side of the ring groove whereby said subassembly wedges the ring in the described radial outward direction and in an axial direction downwardly of the piston.
3. The invention of claim 1, characterized by:
   the combined seal and expander subassembly and the portion of the chamfer engaged thereby being constructed and arranged adjacent said lower side of the ring groove whereby said subassembly wedges the ring in the described radial outward direction and in an axial direction upwardly of the piston.
4. The invention of claim 1, the chamfer characterized by a cone of generation which, at the apex, has a cone angle in the range between about 15° and 40°.
5. The invention of claim 1, characterized by:
   the chamfer engaged by the combined seal and expander subassembly being included as no more than a major part of the rear of the ring, said ring rear further including a step portion therein;
   the sealing tube part of said subassembly in engagement with said chamfer part of the ring as described comprising an oil resistant elastomer.

References Cited

UNITED STATES PATENTS

| 3,066,943 | 12/1962 | Brenneke. | |
| 3,109,661 | 11/1963 | Swaim et al. | 277—143 X |

FOREIGN PATENTS

| 600,689 | 12/1959 | Italy. |
| 158,813 | 5/1957 | Sweden. |

LAVERNE D. GEIGER, Primary Examiner

JEFFREY S. MEDNICK, Assistant Examiner

U.S. Cl. X.R.

277—163, 164, 235